United States Patent [19]

Grünig

[11] 4,422,654
[45] Dec. 27, 1983

[54] HOLLOW ROTARY CLAMPING APPARATUS

[75] Inventor: Kurt Grünig, Lengnau, Switzerland

[73] Assignee: Jos. Habegger, AG, Meinisberg, Switzerland

[21] Appl. No.: 238,343

[22] Filed: Feb. 26, 1981

[30] Foreign Application Priority Data

Mar. 28, 1980 [EP] European Pat. Off. ........ 80810106.7

[51] Int. Cl.³ ............................................. B23B 31/00
[52] U.S. Cl. ........................................................ 279/4
[58] Field of Search ....................... 279/4; 408/239 A

[56] References Cited

U.S. PATENT DOCUMENTS

| | | | |
|---|---|---|---|
| 2,515,183 | 7/1950 | Benjamin et al. | 279/4 |
| 2,782,044 | 2/1957 | Gabriel et al. | 279/4 |
| 2,886,007 | 5/1959 | Manchester | 279/4 |
| 2,958,533 | 11/1960 | Benjamin et al. | 279/4 |
| 3,372,951 | 3/1968 | McCash | 408/239 A |
| 3,439,925 | 4/1969 | Sampson | 279/4 |
| 3,680,435 | 8/1972 | Deplante | 408/239 |
| 3,689,087 | 9/1972 | Flett | 279/4 |

FOREIGN PATENT DOCUMENTS

| | | | |
|---|---|---|---|
| 37371 | 10/1981 | European Pat. Off. | 279/4 |
| 491826 | 10/1928 | Fed. Rep. of Germany . | |
| 1552506 | 12/1969 | Fed. Rep. of Germany . | |
| 1925043 | 12/1969 | Fed. Rep. of Germany . | |
| 1650813 | 11/1970 | Fed. Rep. of Germany . | |
| 1552455 | 8/1971 | Fed. Rep. of Germany . | |
| 417277 | 1/1967 | Switzerland . | |
| 426426 | 6/1967 | Switzerland . | |

Primary Examiner—Leonidas Vlachos
Assistant Examiner—Jerry Kearns
Attorney, Agent, or Firm—Ladas & Parry

[57] ABSTRACT

A fluidically operable hollow rotary clamping apparatus such as for use in lathes, has a housing wall and a piston portion located therein with the surface thereof together with the seal packing secured to the housing wall form a double-acting cylinder. This double-acting cylinder is impacted via two pressure medium inlets. A flange secured to the housing wall and the piston portion which is displaceable in only longitudinal direction, each support a group of ball bearings in which a rotary part is mounted. This rotary part contains symmetrically arranged gearwheels of a racked-bar differential drive, whereby the outer pair of gearwheels acts on a pair of racked bars on a guide tube and the inner gearwheel having a larger or smaller diameter and a greater or lesser number of teeth acts through slots in the guide tube on a racked bar on the actuation tube. The actuation tube is in operational engagement with a collet or the like.

Such a clamping or tensioning apparatus has a better degree of efficiency than the known device, is heated in use to a lesser degree and has a small rate of leakage and may be operated by the standard machine hydraulics or pneumatics due to considerable power transmission.

12 Claims, 3 Drawing Figures

HOLLOW ROTARY CLAMPING APPARATUS

BACKGROUND OF THE INVENTION

The present invention relates to a hollow, rotary clamping apparatus which is hydraulically or pneumatically operable and which is primarily intended for powerful automatic latches.

A number of rotary hydraulic oil clamping or chucking devices are known which vary in structure but have one feature in common namely that the piston portion impacted by the pressure oil rotates and is connected directly to the actuating tube which acts on the collet or the like and the pressure medium is supplied via a labyrinth rotation transmitter. This arrangement produces a number of serious disadvantages. On the one hand the pressure oil is heated to a substantial extent which necessitates use of an oil cooler or heat exchanger and a considerable output is absorbed. Moreover a high rate of leakages occurs in all these known hydraulic clamping cylinders.

Pneumatically operated chucking devices which do not entail the known disadvantages achieve only moderate clamping forces.

BRIEF SUMMARY OF THE INVENTION

It is an object of the present invention to provide a hydralically or pneumatically operable rotary clamping or chucking apparatus in which less output is absorbed than hitherto known devices, which does not need an oil cooler or heat exchanger, and which may also be supplied by the existing machine hydraulics or pneumatics (fluidics) and in which the rate of oil leakage is insignificant.

It is a further object to provide a chucking apparatus which can be operated with conventional operational compressed air with the pneumatic embodiment.

According to the present invention there is provided a hollow rotary clamping apparatus for use in a lathe, actuable by hydraulic or pneumatic pressure medium, including a piston portion adapted to be impacted by the pressure medium and displaceable in longitudinal direction only and wherein a rotary part is arranged in said piston portion and has a symmetrical arranged racked-bar differential drive acting on an actuating tube.

BRIEF DESCRIPTION OF THE DRAWING

The invention will be described further, by way of example, with reference to the accompanying drawings, in which.

DESCRIPTION OF THE PREFERRED EMBODIMENTS

Figure 1:
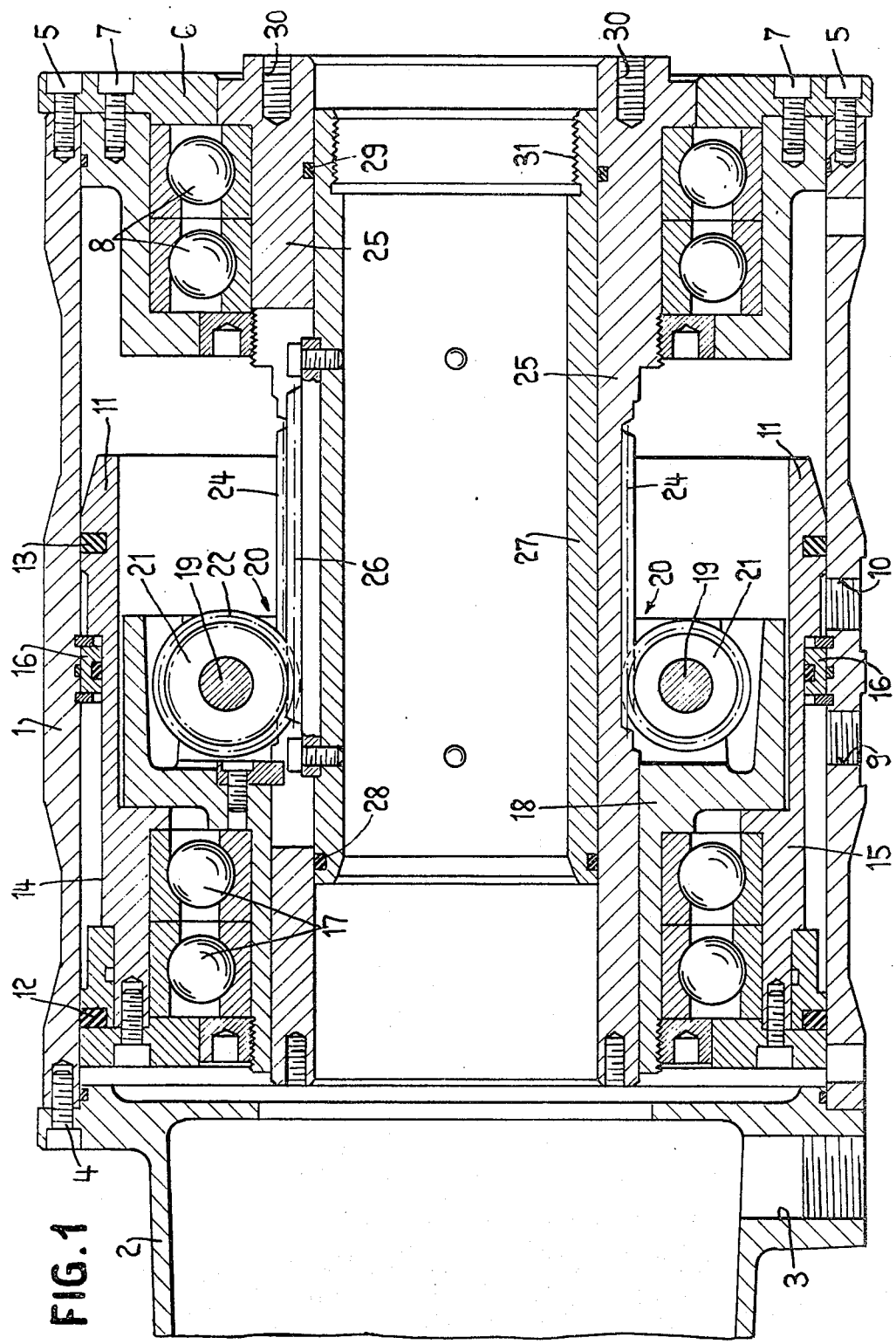
FIG. 1 is a longitudinal section through a clamping apparatus of a first embodiment in accordance with the invention.

A rotary clamping or tensioning apparatus is shown comprising a housing wall 1 to which on one end, the left-hand end in the present drawings, a coolant collecting housing 2 is secured by screws 4, and has a connection 3 for the return of coolant. On the other end of the housing wall a flange 6 is secured by means of screws 5 and via screws 7, a ball bearing housing for a pair of ball races 8 is secured to flange 6. Two pressure medium inlets 9 and 10 are provided at the bottom of the housing wall as shown in the drawings—the pressure medium in the present case being oil. The pressure oil acts on a piston portion 11 which has sealing members 12 and 13 at both ends. The piston portion 11 is only longitudinally displaceable and has a stepped pressure absorbing thrust surface 14 whereby a hydraulic pressure cylinder is formed which has a lesser thickness at both ends. Between the two inlets 9 and 10 is a sealing packing 16 by means of which the pressure cylinder is divided and a double-acting cylinder 14 is formed which permits the piston portion to be moved forward or backwards. This then permits either drawing or pressing. The piston portion 11 has a pair of ball bearing races 17 at its rear end.

Figure 2:
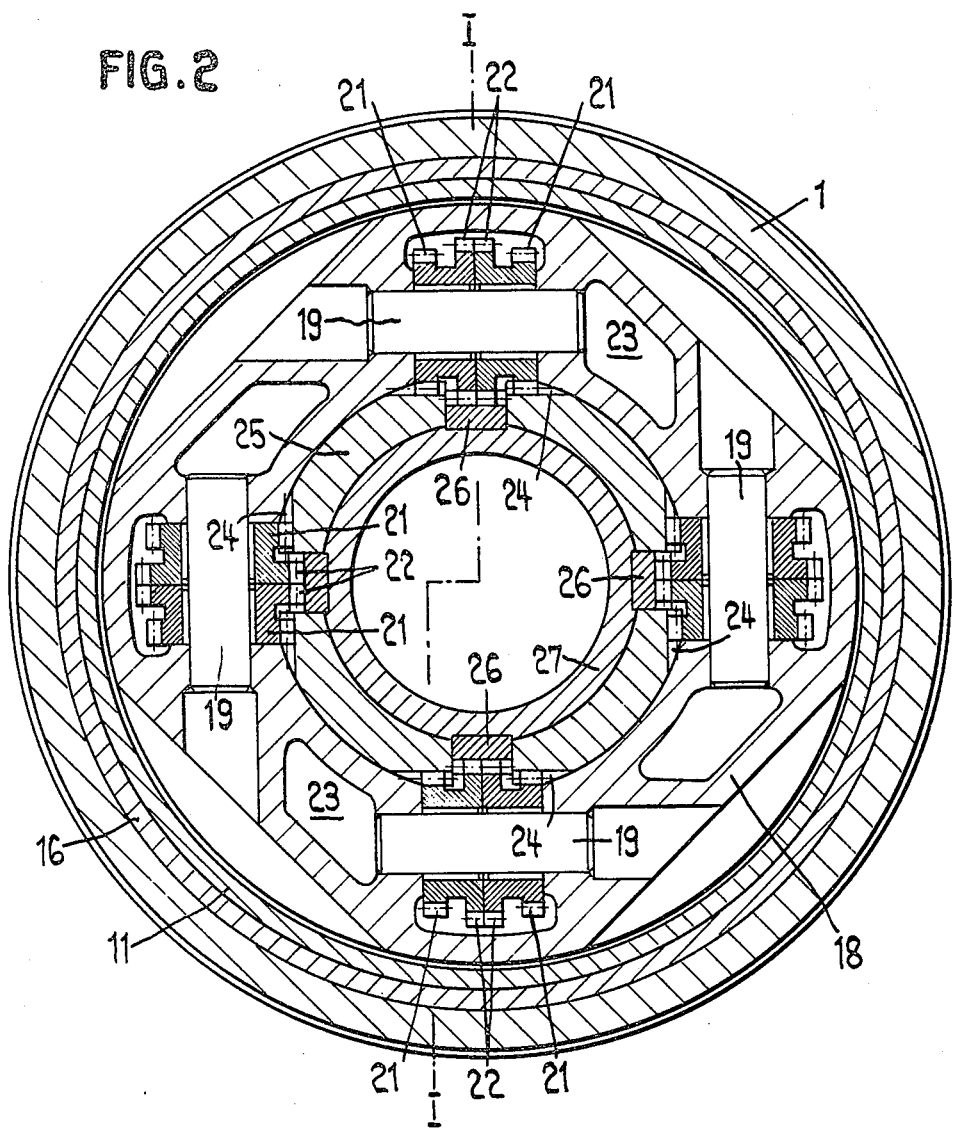
FIG. 2 is a cross-section through the apparatus shown in FIG. 1.

A rotary part 18 extends through the two pairs of ball bearing races 8 and 17 and has a rectangular cross-section with radiused corners (see FIG. 2). FIG. 2 also shows that axles 19 are located in the corners of cast rotary part 18 on each of which axles the gearwheels of a differential racked bar drive 20 (or a rectilinear planetary or epicyclic drive) are mounted. The gearwheels of the drive 20 are comprised of the outer pair of gearwheels 21 having, for example, seventeen teeth and an inner gearwheel 22 which has a larger diameter and which has, for example, twenty teeth. This produces a transmission ratio of $17:3 = 1:5\frac{2}{3}$. The square instead of cylindrical shape of the rotary part 18 not only produces a reduction of weight, but also counteracts deformation forces which might be caused by the effect of radial forces on the gearwheels. Furthermore, recesses 23 are provided in the axle mounting which also serve to reduce the weight of the part. The outer pair of gearwheels 21 acts on a pair of racked bar sections 24 which is located on a guide tube 25 not displaceable in a longitudinal direction. The inner gearwheel 22 acts on a racked bar 26 through slots in the guide tube 25 and said bar 26 is secured to actuating tube 27. Two packings 28 and 29 are arranged between the guide tube 25 and actuating tube 27. Bores 30 are formed at the front of the guide tube 25 and in which bores a flange or the like device for connection to the machine spindle may be secured. The actuating tube 27 has a thread 31 at the front and to which thread a vent pipe or another adaptor member may be screwed to connect the actuating tube with a collet or a chuck or the like.

As is evident from the description above, supply of pressure oil through the inlet 10 causes the piston portion 11 to be displaced to the right and when the gearwheels are in rolling engagement along the pair of racked bars and a tensioning of the actuating tube i.e. a movement to the left, whereby this movement is reduced at a ratio of $1:5\frac{2}{3}$ and therewith the power transmission transmitted with the same factor. This makes it possible with a relatively small actuating force, e.g. 8000 N, which also may be transmitted without problem at high speeds by means of ball bearing, to produce a considerable tensional force, e.g. 45,000 N.

Due to the fact that the pressure medium is not supplied via a rotary transmitter, the leakage rate may be kept very low. Because pressure medium is required only during the tensioning operation, it is generally possible to use the existing hydraulic system of the machine for actuation. Moreover, due to the mounting of the rotary part in ball bearings and due to the fact that the pressure oil is not heated by rotating parts, a far lower heating occurs and thus a far lower output absorption. Calculations and measurements have shown that the absorbed output does not depend upon the oil temperature and dependency upon temperature amounts to from 1/7 to ⅓ of that of conventional tension cylinders. Moreover, this method of construction does not prescribe any minimum pressure to ensure lubrication. Owing to the lower heating, a greater thermal stability of the machine may be obtained whereby these advantages appear especially at high speeds.

Figure 3:
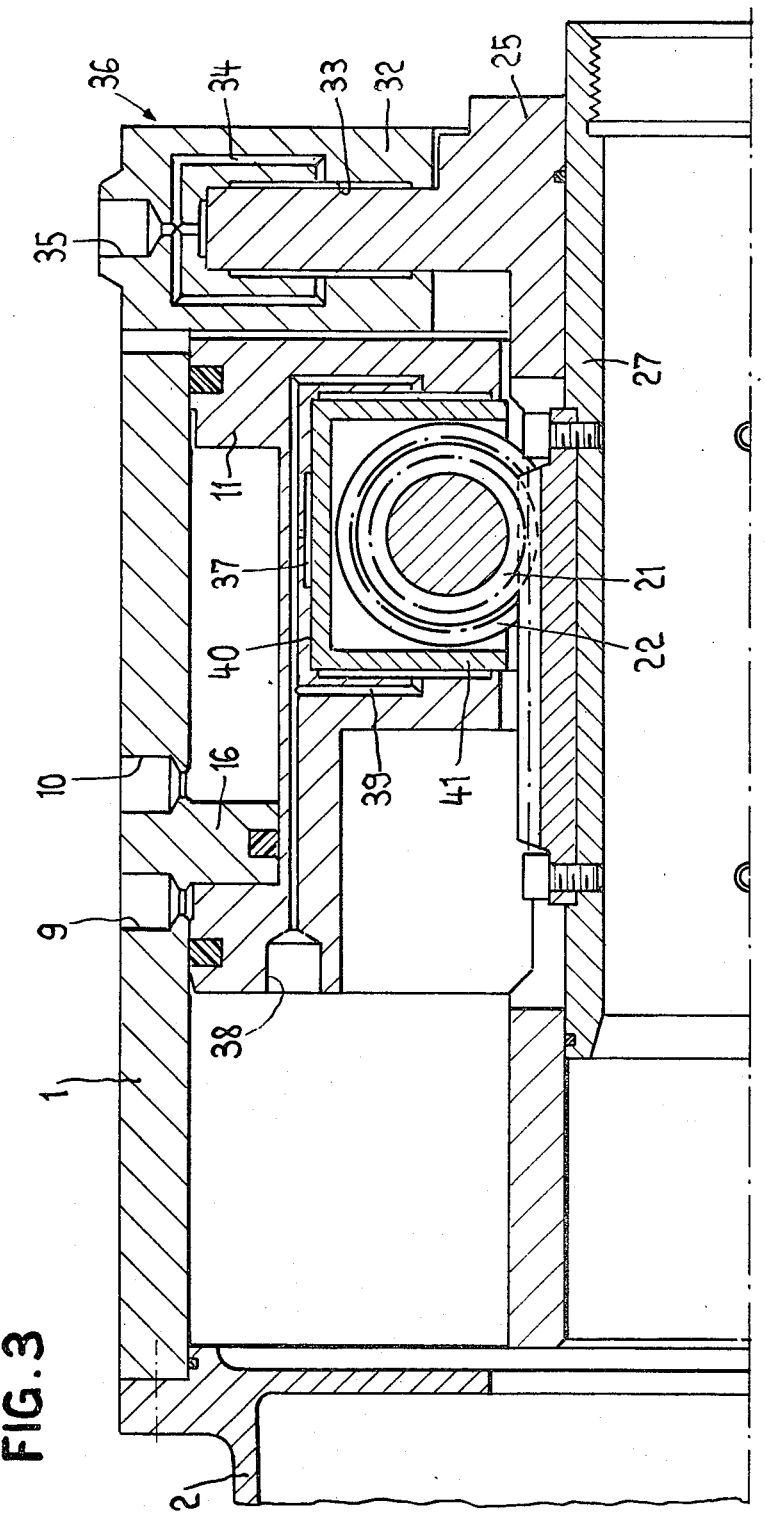
FIG. 3 is a longitudinal section through a second embodiment.

If a high revolution speed is required it is preferable to use the embodiment of FIG. 3, using aerostatic bearings instead of ball bearings 8 and 17. In FIG. 3 the same parts are designated the same way as in FIG. 1 and one sees the housing wall 1 and the coolant collecting housing 2 and the two pressure medium inlets 9 and 10. The end opposed to the collecting housing is formed as flange 32, comprising a inner bearing chamber 33 with conducts 34 and an air-inlet 35 for the compressed air. This aerostatic bearing 36 replaces the ball bearing races 8 of the first embodiment. The ball bearing races 17 of the piston portion 11 is replaced by the aerostatic bearing 37 with the air-inlet 38 and the air-conducts 39. As consequence of the employ of aerostatic bearings the rotary, cylindrical part 40 can be shortened and thus lightened. Four differential racked bar drives are arranged inside a bearing housing 41 of rotary part 40, which outside walls form a part of bearing 37. The other parts and elements remain the same as in the first embodiment and also the working principle, taking in account the cylindrical form of the rotary part, whereby the axles 19 are arranged symmetrically. For operating the aerostatic bearings, air is preferred but, it is also conceivable to use another gas.

Thus, the rotary part 18, does not have to be square and, depending upon the size of the apparatus may have a triangular three cornered hexagonal or polygonal cross-section—having a corresponding number of gears or drives. In the case of cylindrical rotary parts, the number of drives is to be selected in accordance with the size of the apparatus. The transmission ratio may also assume different values, for example, it may be in the region from 1:3 to 1:30, preferably in a region of from 1:4 to 1:10. Moreover, the outer pair of gearwheels may have a larger diameter than the inner gearwheels, whereby the direction of movement between the rotary part 18 and the actuating tube 27 is reversed. Furthermore, it is possible to provide more than a single double-acting cylinder, thus it is also possible to provide a double-acting hydraulic cylinder for each differential drive. This is particularly desirable if, instead of pressure oil, compressed air is used as the pressure medium by means of which the tensional device may also be operated. Thus, normally existing operational compressed air may be used.

When using a safety valve even the most stringent safety regulations do not require separate hydraulics to be used for operating this tension device.

I claim:
1. In a hollow rotary clamping apparatus for use in a lathe, the clamping apparatus including a housing, a piston located coaxially within the housing, the piston having a configuration so as to be displaceable in a longitudinal direction with respect to the apparatus, means for supplying a pressure medium to the piston to displace the piston with respect to the apparatus, a rotary part disposed coaxially within the piston, the rotary part being displaceable with the piston and supported with respect to the piston by bearing means, and an actuating tube to which a collet, chuck or the like is connectable, the actuating tube being displaceable as a result of movement of the rotary part; in which the improvement comprises:
   a racked-bar differential drive mounted on the rotary part, the drive including axles symmetrically arranged on the rotary part, a respective first gearwheel and a respective second gearwheel mounted on each axle, the gearwheels each being rotatable but fixed to the axle on which the gearwheels are mounted so that relative rotation of the first gearwheel with respect to the second gearwheel is prevented, a guide tube located within the rotary part and surrounding said actuating tube, a first racked-bar disposed on the guide tube, the first gearwheel engaging the first racked bar, a slot in the guide tube, and a second racked-bar on the actuating tube, the second gearwheel extending through the slot and engaging the second racked-bar.

2. Apparatus as claimed in claim 1 wherein the bearing means comprises two groups of rollers or ball bearings, the rotary part has a square cross section with radiused corners and the axles of the racked-bar differential drive are disposed in the corners.

3. Apparatus as claimed in claim 1 in which the bearing means comprises two aerostatic bearings.

4. Apparatus as claimed in claim 1 in which the rotary part is cylindrical and the racked bar differential includes four axles.

5. Apparatus as claimed in claim 1, in which, each axle having an outer pair of gearwheels and an inner gearwheel of larger diameter and a greater number of teeth than the outer gearwheels, the outer pair of gearwheels acting on a pair of racked bars on the guide tube.

6. Apparatus as claimed in claim 1, in which the transmission ratio of the racked-bar differential drive is located in a range of from 1:3 to 1:30.

7. Apparatus as claimed in claim 5, in which the range is from 1:3 to 1:10.

8. Apparatus as claimed in claim 1, in which a pressure cylinder is formed by the housing wall of the apparatus and the piston in formed as a double-acting cylinder.

9. Apparatus as claimed in claim 1, in which the rotary part has a cross-section selected from the group comprising triangular, hexagonal and polygonal cross-section, and in which each corner is radiused and has a racked-bar differential drive arranged therein.

10. Apparatus as claimed in claim 1, in which the rotary part has a circular cross-section, and in which the racked bar differential drive is symmetrically arranged with respect to the cross-section.

11. Apparatus as claimed in claim 1, in which the drive has a double-acting pressure cylinder associated therewith.

12. Apparatus as claimed in claim 1, in which each axle has an outer pair of gearwheels and an inner gearwheel the outer pair of gearwheels having a larger diameter than the inner gearwheel whereby the direction of movement of the rotary part with respect to the actuating tube is reversed.

* * * * *